United States Patent
Larmo et al.

(10) Patent No.: US 9,059,848 B2
(45) Date of Patent: Jun. 16, 2015

(54) METHOD AND ARRANGEMENT IN A WIRELESS COMMUNICATION SYSTEM

(75) Inventors: Anna Larmo, Espoo (FI); Riikka Susitaival, Helsinki (FI); Stefan Wager, Espoo (FI)

(73) Assignee: OPTIS CELLULAR TECHNOLOGY, LLC, Plano, TX (US)

( * ) Notice: Subject to any disclaimer, the term of this patent is extended or adjusted under 35 U.S.C. 154(b) by 276 days.

(21) Appl. No.: 13/394,219

(22) PCT Filed: Sep. 25, 2009

(86) PCT No.: PCT/SE2009/051070
§ 371 (c)(1),
(2), (4) Date: Mar. 5, 2012

(87) PCT Pub. No.: WO2011/037503
PCT Pub. Date: Mar. 31, 2011

(65) Prior Publication Data
US 2012/0163322 A1      Jun. 28, 2012

(51) Int. Cl.
*H04L 1/18* (2006.01)
*H04L 1/00* (2006.01)

(52) U.S. Cl.
CPC ....... *H04L 1/1854* (2013.01); *H04L 2001/0093* (2013.01)

(58) Field of Classification Search
CPC .............................. H04L 1/1854; H04L 1/189
USPC ......... 370/328–329, 332–333, 336, 341, 343, 370/345–346, 437, 441–443, 449–450, 465
See application file for complete search history.

(56) References Cited

U.S. PATENT DOCUMENTS 6,512,751 B1 *   1/2003   Struhsaker et al. ........... 370/329
8,213,372 B2 *   7/2012   Kim et al. ..................... 370/329
(Continued)

FOREIGN PATENT DOCUMENTS

FR          2916591          11/2008
WO     2009035301 A2         3/2009

OTHER PUBLICATIONS

MAC functions: ARQ; 3GPP TSG-RAN2 Meeting #51; Tdoc R2-060374; http://www.3gpp.org/ftp/tsg-ran/WG2_RL2/TSGR2_51/Documents/.

(Continued)

*Primary Examiner* — Kevin Mew
(74) *Attorney, Agent, or Firm* — Vincent J. Allen; Stephen Y. Liu; Carstens & Cahoon, LLP

(57) ABSTRACT

Method and arrangement in a base station for providing feedback to user equipments in a cell concerning the reception status of data received from the user equipments. The base station and the user equipments are comprised in a wireless communication system, adapted for contention based transmissions. The method comprises sending a contention based grant to a plurality of user equipments within the cell, receiving data from any user equipment and verifying if the data is correctly received. Also, the method comprises sending feedback to any user equipment that has used the contention based grant, wherein the feedback comprises an ACK, if it is verified that data has been correctly received from at least one user equipment and the feedback comprises a NACK if it is verified that data has not been correctly received from any user equipment. Also, a corresponding method and arrangement in a user equipment is described.

12 Claims, 6 Drawing Sheets

(56) References Cited

U.S. PATENT DOCUMENTS

| | | | |
|---|---|---|---|
| 8,265,682 B2* | 9/2012 | Bertrand et al. | 455/522 |
| 8,295,240 B2* | 10/2012 | Suzuki et al. | 370/329 |
| 8,320,319 B2* | 11/2012 | Lohr et al. | 370/329 |
| 8,345,615 B2* | 1/2013 | Barraclough et al. | 370/329 |
| 8,374,144 B2* | 2/2013 | Park et al. | 370/329 |
| 8,385,283 B2* | 2/2013 | Zhang et al. | 370/329 |
| 8,441,970 B1* | 5/2013 | Suzuki et al. | 370/310 |
| 8,717,907 B2* | 5/2014 | Bergquist et al. | 370/241.1 |
| 8,838,109 B2* | 9/2014 | Anigstein et al. | 455/436 |
| 2001/0014090 A1* | 8/2001 | Wood, Jr. | 370/348 |
| 2009/0055703 A1* | 2/2009 | Kim et al. | 714/748 |
| 2010/0074172 A1* | 3/2010 | Fontaine et al. | 370/328 |
| 2011/0249632 A1* | 10/2011 | Eriksson et al. | 370/329 |
| 2012/0014343 A1* | 1/2012 | Womack et al. | 370/329 |
| 2013/0128871 A1* | 5/2013 | Suzuki et al. | 370/336 |

OTHER PUBLICATIONS

International Preliminary Report on Patentability and Written Opinion issued in Application No. PCT/SE2009/051070 dated Mar. 27, 2012.

International Search Report for PCT/SE2009/051070 mailed Aug. 2, 2010.

Parthasarathy Narasimhan et al., "A New Protocol for the Integration of Voice and Data over PRMA", IEEE Journal on Selected Areas in Communications, vol. 14, No. 4., May 1, 1996.

* cited by examiner

METHOD AND ARRANGEMENT IN A WIRELESS COMMUNICATION SYSTEM

This application is the U.S. national phase of International Application No. PCT/SE2009/051070 filed 25 Sep. 2009 which designated the U.S., the entire contents of each of which are hereby incorporated by reference.

TECHNICAL FIELD

The present invention relates to a method and an arrangement in a base station and a method and an arrangement in a user equipment. In particular, it relates to a mechanism for providing feedback to user equipments in a cell concerning the reception status of data received from the user equipments due to a contention based grant.

BACKGROUND

For 3GPP Long Term Evolution (LTE) uplink Release 10, a contention based (CB) transmission scheme has been proposed to improve the latency of the system. The contention based scheme basically means broadcasting a grant to the cell to which any uplink time aligned User Equipment (UE), that has data to send may respond with a data transmission. Since many user equipments can use the grant, it is difficult to use the Hybrid Automatic Resend reQuest (HARQ) protocol to correct transmission errors, since typically errors are caused by interference from other user equipment sending data at the same time.

In order to improve performance of transmission in both the downlink and uplink direction, LTE in non-contention based mode uses Hybrid Automatic Repeat Request (HARQ). The basic idea of HARQ, for uplink transmission, is that after receiving data in an uplink subframe the eNB, or base station as it also may be referred to, attempts to decode it and then reports to the user equipment whether the decoding was successful by sending an acknowledgement (ACK) or unsuccessful by sending a negative acknowledgement (NACK). In the latter case of an unsuccessful decoding attempt, the user equipment thus receives a NACK in a later downlink subframe, and can retransmit the data that was not successfully received at the eNB.

However, in the case of a decoding error in a contention based transmission scheme, the eNB will not be able to determine the identity of the transmitting user equipment, and will therefore not be able to correctly combine (re-)transmissions from different user equipments transmitting of the same grant. Thus, the HARQ operation is disabled in the contention based transmission scheme.

Yet, having a retransmission scheme would significantly improve the performance in the cases where the transmissions do collide or are otherwise not successful.

In addition, a missed assignment will in general result in block errors that need to be corrected by higher-layer protocols, which in turn has a negative impact on performance in terms of throughput and latency. Also, increasing the delay may cause undesirable interactions with Transmission Control Protocol (TCP) based applications.

SUMMARY

It is therefore an object of the present invention to provide a mechanism for improving the performance in a wireless communication system.

According to a first aspect of the present invention, the object is achieved by a method in a base station for providing feedback to user equipments in a cell. The provided feedback concerns the reception status of data received from the user equipments. The base station and the user equipments are comprised in a wireless communication system. The wireless communication system is adapted for contention based transmissions. The base station is adapted to serve a plurality of user equipments within the cell. The method comprises sending a contention based grant to a plurality of user equipments within the cell. Also, the method comprises receiving data from at least one user equipment. Further, the method comprises verifying if the data is correctly received. Additionally, the feedback is sent to the at least one user equipment that has used the contention based grant. The feedback comprises an acknowledgement feedback ACK, if it is verified that data has been correctly received from at least one user equipment and the feedback comprises a non-acknowledgement feedback NACK if it is verified that data has not been correctly received from any user equipment.

According to a second aspect of the present invention, the object is achieved by an arrangement in a base station for providing feedback to user equipments in a cell. The provided feedback concerns the reception status of data received from the user equipments. The base station and the user equipments are comprised in a wireless communication system. The wireless communication system is adapted for contention based transmissions. The base station is adapted to serve a plurality of user equipments within the cell. The arrangement comprises a transmitter. The transmitter is adapted to send a contention based grant and transmission feedback to a plurality of user equipments within the cell. Also, the arrangement comprises a receiver. The receiver is adapted to receive data from at least one user equipment. Furthermore, the arrangement comprises a verification unit. The verification unit is adapted to verify if the data is correctly received.

According to a third aspect of the present invention, the object is achieved by a method in a user equipment for receiving feedback from a base station concerning the reception status of data sent to the base station. The base station and the user equipment are comprised in a wireless communication system. The wireless communication system is adapted for contention based transmissions. The base station is adapted to serve a plurality of user equipments within a cell. The method comprises receiving a contention based grant from the base station. Also, the method comprises sending data to the base station. Furthermore, in addition, the method comprises receiving acknowledgement feedback ACK or non-acknowledgement feedback NACK from the base station. If an ACK is received, the user equipment prepares to send new data to the base station, when next grant is received.

According to a fourth aspect of the present invention, the object is achieved by an arrangement in a user equipment for receiving feedback from a base station. The received feedback concerns the reception status of data sent to the base station. The base station and the user equipment are comprised in a wireless communication system. The wireless communication system is adapted for contention based transmissions. The base station is adapted to serve a plurality of user equipments within a cell. The arrangement comprises a receiver. The receiver is adapted to receive a contention based grant and acknowledgement feedback ACK or non-acknowledgement feedback NACK from the base station. Further, the arrangement comprises a sender. The sender is adapted to send data to the base station. In addition the arrangement also comprises a preparing unit. The preparing unit is adapted to prepare new data to be sent to the base station, when next grant is received.

Thanks to the application contention based feedback, sent either as an ACK, if it is verified that data has been correctly received from at least one user equipment, or as a NACK if it is verified that no data at all has been correctly received from any user equipment, redundant retransmissions are avoided. The present methods and arrangements further clarifies the contention based concept and proposes more options for how feedback on the transmission success can be delivered to the user equipments. Also, according to the present methods and arrangements, the identity of the user equipment sending data does not need to be transmitted to the base station, which saves resources. Further, the overall reduced signalling resulting from the present methods and arrangements render higher capacity and better coverage within the wireless communication system. Thus the performance of the wireless communication system is improved.

Other objects, advantages and novel features of the invention will become apparent from the following detailed description of the invention.

BRIEF DESCRIPTION OF THE DRAWINGS

The invention is described in more detail with reference to attached drawings illustrating exemplary embodiments of the invention and in which.

DETAILED DESCRIPTION

The invention is defined as a method and an arrangement in a base station and a method and an arrangement in a user equipment, which may be put into practice in the embodiments described below. This invention may, however, be embodied in many different forms and is not to be considered as limited to the embodiments set forth herein; rather, these embodiments are provided so that this disclosure will be thorough and complete, and convey the scope of the invention to those skilled in the art.

Still other objects and features of the present invention may become apparent from the following detailed description considered in conjunction with the accompanying drawings. It is to be understood, however, that the drawings are designed solely for purposes of illustration and not as a definition of the limits of the invention, for which reference is to be made to the appended claims. It is further to be understood that the drawings are not necessarily drawn to scale and that, unless otherwise indicated, they are merely intended to conceptually illustrate the structures and procedures described herein.

Figure 1:
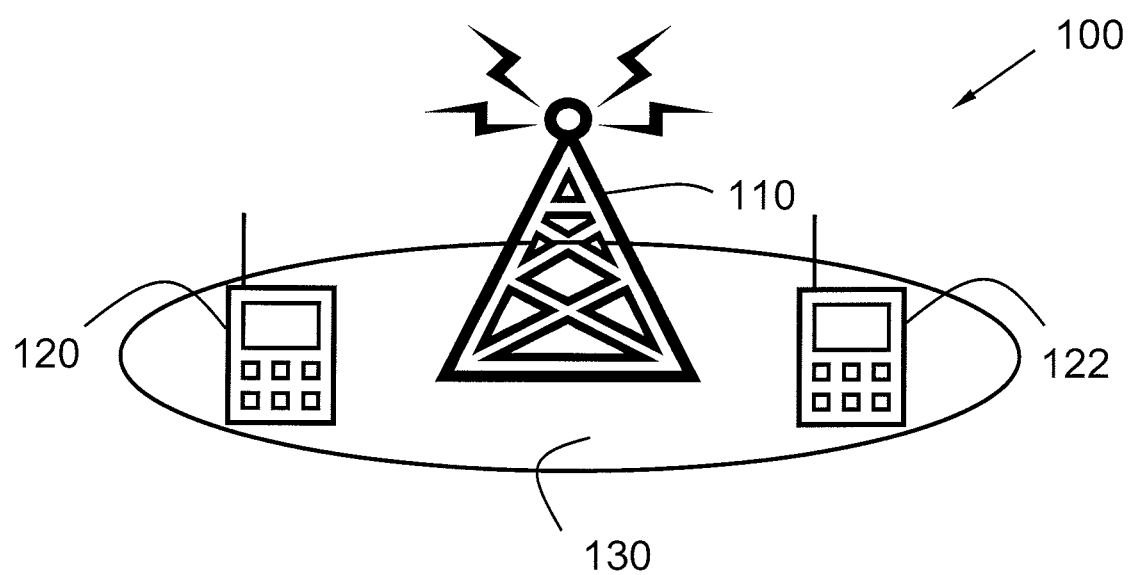
FIG. 1 is a schematic block diagram illustrating embodiments of a wireless communication system.

FIG. 1 depicts a wireless communication system 100, such as e.g. the E-UTRAN, LTE, LTE-Adv, 3rd Generation Partnership Project (3GPP) WCDMA system, Global System for Mobile communications/Enhanced Data rate for GSM Evolution (GSM/EDGE), Wideband Code Division Multiple Access (WCDMA), Worldwide Interoperability for Microwave Access (WiMax), or Ultra Mobile Broadband (UMB), just to mention some few arbitrary possible options.

The wireless communication system 100 comprises a base station 110 a first user equipment 120 and a second user equipment 122 adapted to communicate with each other over at least one radio channel, within a cell 130. The wireless communication system 100 is based on a contention based transmission scheme.

The base station 110 may be referred to as e.g. a NodeB, an evolved Node B (eNode B, or eNB), a base transceiver station, Access Point Base Station, base station router, or any other network unit capable to communicate with the user equipment 120, 122 within the cell 130, depending e.g. of the radio access technology and terminology used. In the rest of the description, the term "base station" will be used for the base station 110, in order to facilitate the comprehension of the present methods and arrangements.

The user equipments 120, 122 may be represented by e.g. a wireless communication terminal, a mobile cellular phone, a Personal Digital Assistant (PDA), a wireless platform, a laptop, a computer or any other kind of device capable to communicate wirelessly with the base station 110. Further, the user equipments 120, 122 within the cell 130 may, according to some embodiments be grouped together in subsets of user equipments 120, 122, forming contention based groups.

In the following, the present methods and arrangements are further elaborated with specific reference to LTE systems and more particularly with respect to the uplink in LTE, i.e. for the link from the user equipment 120, 122 towards the base station 110. However, it is obvious to a skilled person that corresponding concepts could also be applied in other wireless communication systems 100.

A possible solution to the problem of providing feedback in a contention based transmission environment, according to some embodiments, may be to comprise the user equipment identity in the feedback and thus allow individual feedback. However, sending individual feedback may not be possible if the user equipment identities are unknown to the base station 110, which might be the case if there was a collision. Thus, individual feedback based on user equipment identity may be sent when the user equipment identity can be known, i.e. not always. Basically, this means that only positive feedback, ACK, can be provided as individual feedback, as if the decoding failed, the base station 110 may not be aware of the user equipment identity.

Such individual feedback, or partly individual feedback, in a contention based transmission scheme, based on user equipment identity may be provided using Physical Downlink Control Channel (PDCCH) resources for transmitting the transmission acknowledgement. The PDCCH is however a limited resource carrying uplink and downlink scheduling commands, and could become a bottleneck if also used for acknowledging contention based transmissions.

The present methods and arrangements provide a feedback for made uplink transmissions within the wireless system 100. However, instead of sending a separate feedback message to each user equipment 120, 122, a single HARQ feedback on a Physical Hybrid Automatic Repeat Request Indicator Channel (PHICH) is sent to a plurality of user equipments 120, 122 in the cell 130. The HARQ feedback may be sent to all user equipment 120, 122 in the cell 130, or sent to a subset of user equipment 120, 122 in the cell 130, according to different embodiments.

The used PHICH resource is derived from the original contention based grant. The base station 110 decides which feedback to send by applying a logical OR operation: If any user equipment 120, 122 would be receiving ACK, then an ACK is sent to the plurality of user equipments 120, 122. Otherwise, i.e. if no data is correctly received from any user equipment 120, 122, a NACK is sent. This allows for fast feedback and fast retransmissions.

To illustrate with an example, it may occur, when using a contention based transmitting scheme that two user equipments 120 and 122 in the cell 130 may transmit data simultaneously. One user equipment 120 may be successful and the other user equipment 122 may not be successful. If an ACK is sent both to the successful user equipment 120 and to the non successful user equipment 122, according to the present method, both will stop transmitting. However, if instead a NACK were sent, both would continue transmitting data. Since a retransmission may be triggered later on Radio Link Control (RLC) level, it is better to send an ACK at this moment, and avoid the redundant retransmission for the successful user equipment 120.

The present methods and arrangements also may make use of a Local NACK in the user equipment 120, 122. Thus upon receiving the NACK as a response to the contention based transmission, the user equipment 120, 122 may perform a Local NACK from Medium Access Control (MAC) to RLC to trigger a RLC retransmission. The idea thus is that the HARQ transmitter provides local NACK to the ARQ transmitter. The local NACK concept is known from Tdoc R2-060374, which may be retrieved from: http://www.3gpp.org/ftp/tsg_ran/WG2_RL2/TSGR2_51/Documents/.

The MAC is situated in the protocol sublayer above the physical layer and below the RLC layer in the LTE protocol stack. The connection to the physical layer below is through transport channels, and the connection to the RLC layer above is through logical channels. The MAC layer may perform data transmission scheduling and multiplexing/demultiplexing between logical channels and transport channels. In the user equipment 120, 122, it may also be responsible for control of random access, timing advance and discontinuous reception.

The RLC layer is located between the Packet Data Convergence Protocol (PDCP) layer and the MAC layer in the LTE user plane protocol stack. The main functions of the RLC layer are segmentation and reassembly of upper layer packets in order to adapt them to the size which can actually be transmitted over the radio interface. For radio bearers which need error-free transmission, the RLC layer also may perform retransmission to recover from packet losses. Additionally, the RLC layer may perform reordering to compensate for out-of-order reception due to HARQ operation in the MAC layer. There may be one RLC entity per radio bearer.

A basic concept is that user equipments 120, 122 are allowed to use uplink resource blocks in a contention based fashion. According to some embodiments, uplink resources that have not been allocated to any dedicated user equipment 120, 122, and would thus otherwise be left unused, may be offered for contention based grant. In this way, the resources for contention based access do not affect other scheduled uplink transmissions according to those embodiments.

A general property of contention based transmissions is that the error rate may increase if data packets collide with each other. Collisions reduce the transmission throughput and the throughput becomes sensitive to the system load. If the load is allowed to increase beyond a certain limit, the collision probability increases rapidly, the wireless communication system 100 may become unstable, and the throughput may decrease. Therefore, contention based transmissions may not interfere with dedicated transmissions, according to some embodiments. Thus, each allocated resource block may either be allocated for contention based transmission or dedicated transmission. One optional way to achieve such isolation is to allow contention based transmission only in uplink resource blocks that have not been reserved for dedicated uplink transmission.

Furthermore, a random delay may optionally be added to spread the retransmissions in time to avoid further collisions, according to some embodiments. In addition, a contention based uplink prohibit timer can be introduced to prohibit the user equipments 120, 122 to use contention based grants after receiving a NACK on PHICH.

Figure 2:
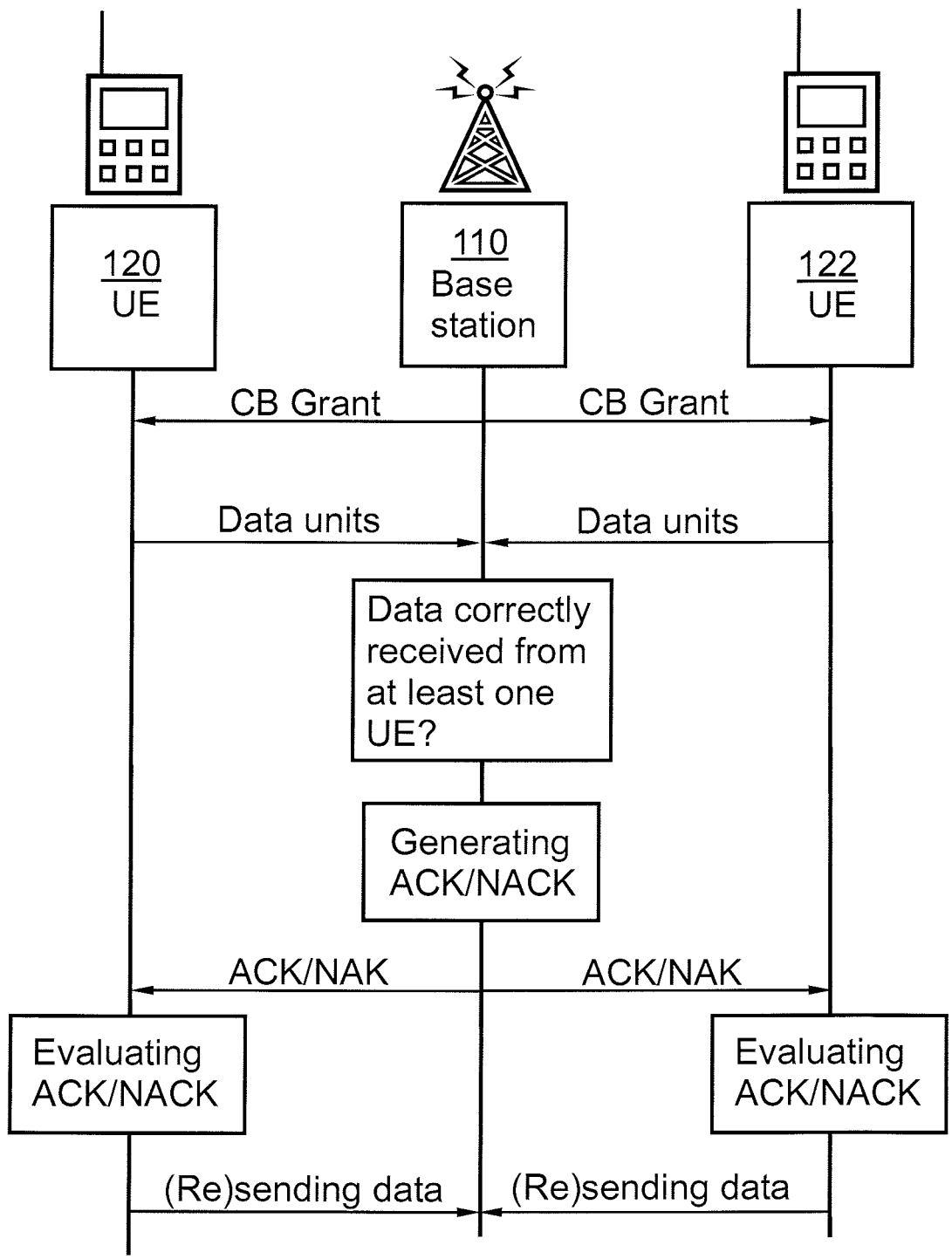
FIG. 2 is a combined signalling and flowchart illustrating radio signal transmission according to some embodiments.

FIG. 2 is a combined signalling and flowchart illustrating radio signal transmission according to some embodiments. The purpose of this illustration is to provide a general overview of the present methods and the functionalities involved.

The present methods and arrangements are related to a scenario comprising at least one user equipments 120, 122 in the cell 130 with uplink time alignment but no scheduling grant is allocated. The user equipment 120, 122 receives data in its buffer, and the present methods and arrangements relates to how to minimize the latency for this data to be securely transmitted to the base station 110 over the air interface.

In a first step, the base station 110 schedules and sends a contention based grant to a plurality of user equipments 120, 122 within the cell 130. The contention based grant may be sent to all user equipments 120, 122 within the cell 130, or sent to a subset of user equipments 120, 122 within the cell 130, i.e. subsets of user equipments 120, 122 forming contention based groups, according to different embodiments.

The subsets of user equipments 120, 122 forming contention based groups, which may be given access to different contention based resources. Thus for example, there may be a premium user contention based group and a regular user contention based group, just to mention an arbitrary example.

Thus any synchronized user equipments 120, 122 with uplink data but no valid grant can now read this contention based grant and use it to make a contention based data transmission. As a response to the sent grant, user equipments 120, 122 that have data to send to the base station 110 may use the contention based grant for sending data according to the grant.

When the base station 110 receives signalling from the user equipments 120, 122, the base station 110 may perform some arbitrary verification of the correctness of the received data. Thus the base station 110 may attempt to decode the transport blocks in the uplink sub-frames in which it has detected an assignment and by means of e.g. a Cyclic Redundancy Check (CRC) estimate whether the transport block is correctly received or not.

If it is verified that data is correctly received from at least one user equipments 120, 122, then an acknowledgement (ACK) is generated. If no data at all is correctly received, a negative acknowledgement, or non-acknowledgement (NACK) is generated.

Thus, according to the present solution, a logical OR operation is used to decide the feedback. If there is just one user equipment 120, 122 that should receive an ACK, then and ACK is sent, otherwise a NACK is sent.

The benefit with always sending an ACK, even when only one user equipment 120, 122 should get an ACK, is that this minimizes wasting radio resources on redundant retransmissions. The benefit of sending a NACK when all user equipments 120, 122 should get a NACK is that then all the user equipments 120, 122 may perform faster RLC retransmissions with the help of the local NACK feature, compared to the case where no NACK is sent. In an unfortunate case, in which a user equipment 120, 122 should get a NACK but actually gets an ACK, the situation may eventually be resolved by having the user equipment 120,122 receiving the RLC Status message and performing an RLC level retransmission.

The thus generated feedback, either ACK or NACK is sent to all the user equipments 120, 122 within the cell 130, or sent to a subset of user equipments 120, 122 within the cell 130, i.e. subsets of user equipments 120, 122 forming contention based groups, according to different embodiments.

The feedback may be sent on the PHICH channel. PHICH is determined from the Control Channel Element (CCE) of the PDCCH carrying the contention based grant. However, in this case, all user equipments 120, 122 that used the contention based grant may also read the contention based feedback (ACK or NACK). Thus, the feedback according to the present methods and arrangements has a one to many mapping, instead of a one to one mapping that is usually assumed with HARQ feedback.

Since the feedback will possibly be received by a plurality of user equipment 120, 122, there may be rules on what feedback to send, in case the feedback should in reality be different for different user equipment 120, 122.

The user equipments 120, 122 receiving the ACK or NACK feedback evaluate the feedback. If an ACK has been received, the user equipments 120, 122 continues sending the next data whenever the subsequent grant, which may be yet a contention based grant or a dedicated grant, is detected. If a NACK is received on PHICH as a response to the contention based uplink transmission, the data is resent. Thus, after the user equipment 120, 122 has received a NACK, it can be prohibited to use contention based resources for any data. This data can be RLC retransmission or some new data. The prohibit timer can be valid over a fixed time period or until the next dynamic grant for the user equipment's 120, 122 Cell Radio Network Temporary Identifier (C-RNTI). When the prohibit timer is running, the user equipment 120, 122 is able to do a scheduling request on the Physical Uplink Control Channel (PUCCH).

Since the contention based concept disables HARQ operation, it should be noted that the New Data Indicator NDI bit is useless in a contention based grant, and the user equipment 120, 122 should not read this bit. The NDI bit in the grant may optionally be marked as reserved for future purposes.

The user equipment 120, 122 may only be allowed to use a contention based grant if this is the very first transmission for this HARQ process i.e. no previous NDI is available, or if the uplink grant was received on PDCCH for the Contention Based Radio Network Temporary Identifier CB-RNTI and the HARQ buffer of the identified process is empty, according to some embodiments.

No HARQ level retransmissions are supported for the contention based transmissions. Thus, the maximum number of transmission attempts may be considered reached after the first transmission attempt and the user equipment 120, 122 HARQ buffer may optionally be flushed.

In LTE systems, data unit reordering due to HARQ retransmissions is corrected by the RLC layer. A reordering timer may be used to wait for potentially successful retransmissions in case a gap in received RLC sequence numbers is detected. The transmission of a status report to request an RLC retransmission may be delayed until the timer expires, and cancelled if the retransmission was successful in the mean time. With contention based uplink, the reordering timer may be used if MAC level retransmissions are performed and soft combining is used. Else any gap may be due to loss of data.

According to some embodiments, a local NACK may be passed in the user equipment 120, 122 from the MAC layer to the RLC layer which triggers an RLC retransmission of the lost data. As no variance in MAC transmission delay occurs, the reordering timer in the RLC receiver may not be needed. The RLC layer may also be made aware whether MAC layer retransmission is supported or not. RLC polling for status reports can also be optimized for contention based transmissions. The importance of the RLC polling mechanism is reduced if retransmissions are mostly triggered by local NACKs due to missing MAC ACK. Accordingly, the optional poll timer may be reduced to a pure safeguard mechanism to prevent protocol stall, i.e. the value of the timer could be increased or the timer be switched off. Polling on empty buffer is then sufficient and could be triggered by checking the buffer status.

Figure 3:
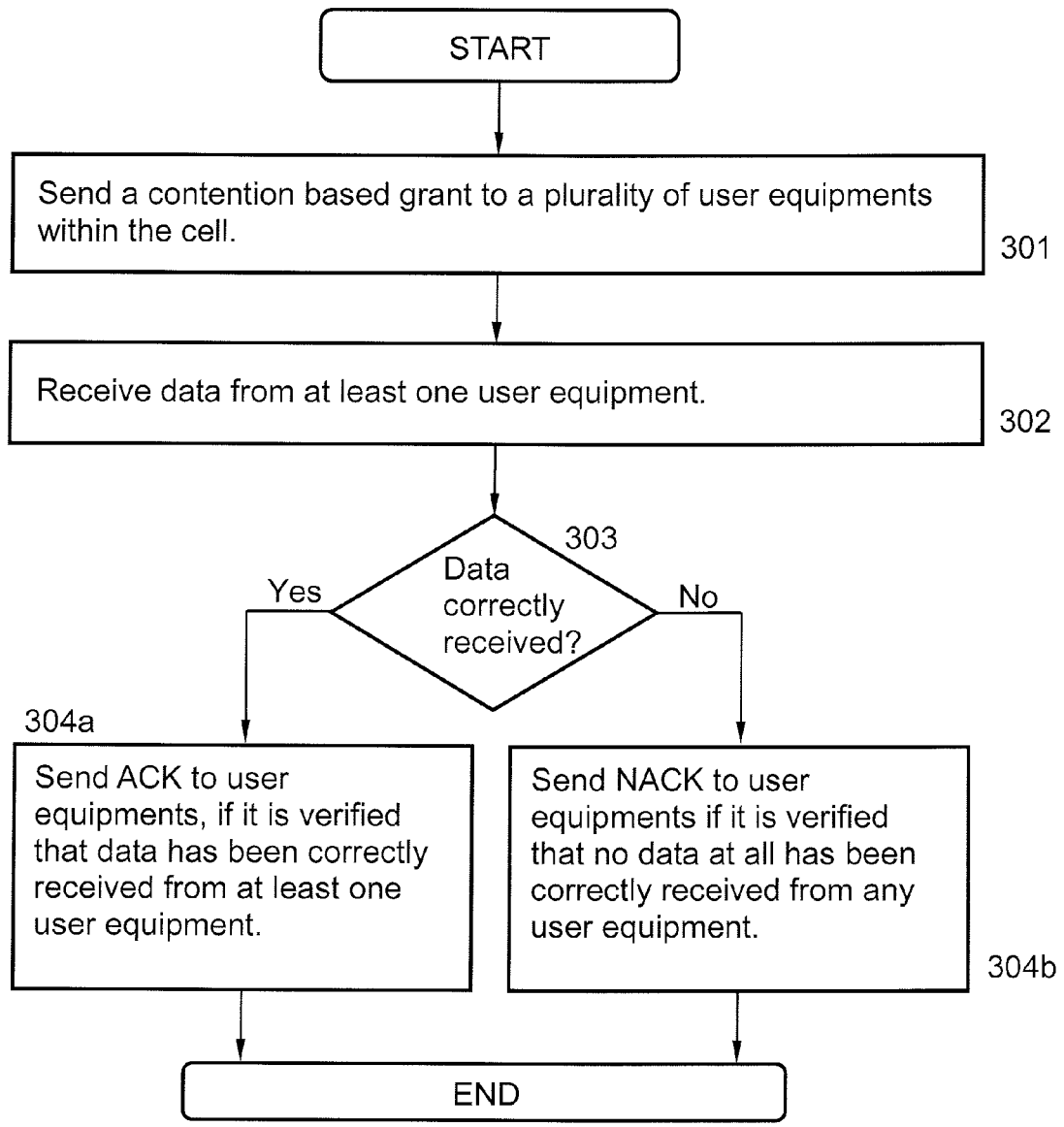
FIG. 3 is a flow chart illustrating embodiments of a method in a base station.

FIG. 3 is a flow chart illustrating embodiments of method steps 301-304 performed in a base station 110 for providing feedback to user equipments 120, 122 in a cell 130 concerning the reception status of data received from the user equipments 120, 122. The base station 110 and the user equipments 120, 122 are comprised in a wireless communication system 100 adapted for contention based transmissions. The base station 110 is adapted to serve a plurality of user equipments 120, 122 within the cell 130. The wireless communication system 100 may be e.g. a LTE radio network and the base station 110 may be e.g. an evolved node B, eNB, according to some embodiments.

To appropriately provide feedback to a plurality of user equipments 120, 122 within the cell 130, concerning the reception status of received data packets, the method may comprise a number of method steps 301-304.

It is however to be noted that some of the described method steps are optional and only comprised within some embodiments. Further, it is to be noted that the method steps 301-304 may be performed in any arbitrary chronological order and that some of them, e.g. step 302 and step 303, or even all steps may be performed simultaneously or in an altered, arbitrarily rearranged, decomposed or even completely reversed chronological order. The method may comprise the following steps:

Step 301

A contention based grant is sent to a plurality of user equipments 120, 122 within the cell 130.

The plurality of user equipments 120, 122 within the cell 130 may optionally comprise a subset of all the user equipments 120, 122 within the cell 130. For example, some user equipments 120 may be comprised in a premium contention based group and some user equipments 122 may be comprised in a regular contention based group.

According to some embodiments, the plurality of user equipments 120, 122 within the cell 130 may optionally comprise all the user equipments 120, 122 within the cell 130.

Step 302

Data is received from at least one user equipment 120, 122.

Step 303

It is verified if the data is correctly received. The data verification may comprise decoding, or attempting to decode the data and perform e.g. a cyclic redundancy check CRC, or any other appropriate data verification procedure.

Step 304

A feedback is sent to the at least one user equipment 120, 122 that has used the contention based grant, wherein the feedback comprises an acknowledgement feedback ACK, if it is verified that data has been correctly received from at least one user equipment 120, 122. Alternatively, the feedback comprises a non-acknowledgement feedback NACK if it is verified that data has not been correctly received from any user equipment 120, 122. The feedback ACK/NACK may be sent over a Physical Hybrid Automatic Repeat Request Indicator Channel (PHICH), according to some embodiments.

Figure 4:
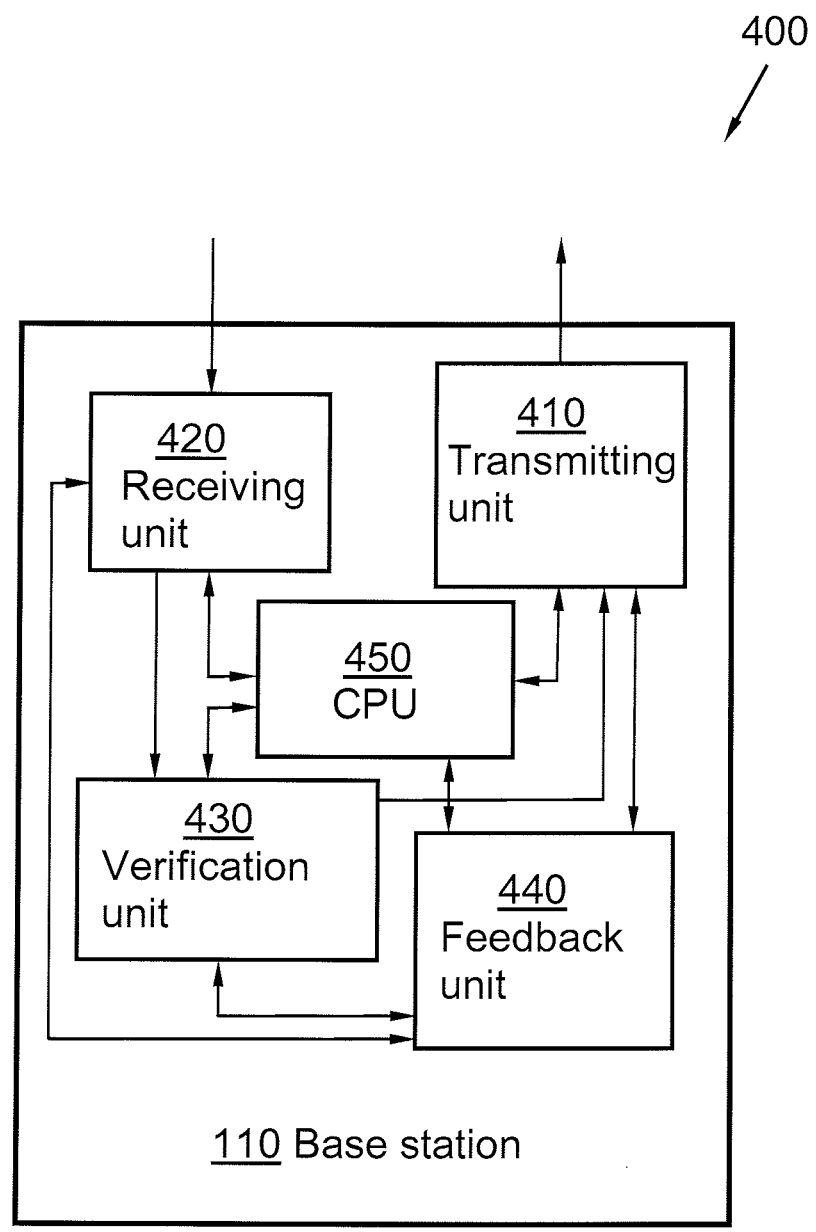
FIG. 4 is a schematic block diagram illustrating embodiments of a base station arrangement.

FIG. 4 schematically illustrates an arrangement 400 in a base station 110. The base station 110 may be e.g. an eNB. The arrangement 400 is adapted to perform the method steps 301-304 in order to provide feedback to user equipments 120, 122 in a cell 130. The feedback concerns the reception status of data received from the user equipments 120, 122. The base station 110 and the user equipments 120, 122 are comprised in a wireless communication system 100. The wireless communication system 100, the base station 110 and the user equipments 120, 122 are adapted for contention based transmissions. The base station 110 is adapted to serve a plurality of user equipments 120, 122 within the cell 130. The wireless communication system 100 may be e.g. a LTE radio network and the base station 110 may be e.g. an evolved node B, eNB, according to some embodiments.

In order to perform the method steps 301-304 correctly, the base station arrangement 400 comprises a plurality of units such as e.g. a transmitter 401. The transmitter 410 is adapted to send a contention based grant, and to send transmission feedback to a plurality of user equipments 120, 122 within the cell 130. The transmission feedback may be an ACK or a NACK. Also, the arrangement 400 comprises a receiver 420. The receiver 420 is adapted to receive data from at least one user equipment 120, 122. In addition, the arrangement 400 comprises a verification unit 430. The verification unit 430 is adapted to verify if the data is correctly received.

The arrangement 400 also comprises a feedback unit 440. The feedback unit 440 is adapted to generate acknowledgement feedback ACK if it is verified that data has been correctly received from at least one user equipment 120, 122. The feedback unit 440 is further adapted to generate non-acknowledgement feedback NACK if no data is correctly received from any user equipment 120, 122.

Optionally, the arrangement 400 further also may comprise a processing unit 450. The processing unit 450 may be represented by e.g. a Central Processing Unit (CPU), a processor, a microprocessor, or other processing logic that may interpret and execute instructions. The processing unit 450 may perform all data processing functions for inputting, outputting, and processing of data including data buffering and device control functions, such as call processing control, user interface control, or the like.

It is to be noted that any internal electronics of the base station 110 and/or the base station arrangement 400, not completely necessary for understanding the present method according to the method steps 301-304 has been omitted from FIG. 4, for clarity reasons. Further, it is to be noted that some of the described units 410-450 comprised within the arrangement 400 in the base station 110 are to be regarded as separate logical entities but not with necessity separate physical entities. To mention just one example, the receiving unit 420 and the transmitting unit 410 may be comprised or co-arranged within the same physical unit, a transceiver, which may comprise a transmitter circuit and a receiver circuit, which transmits outgoing radio frequency signals and receives incoming radio frequency signals, respectively, via an antenna. The radio frequency signals transmitted between the base station 110 and the user equipments 120, 122 may comprise both traffic and control signals e.g. paging signals/messages for incoming calls, which may be used to establish and maintain a voice call communication with another party or to transmit and/or receive data, such as SMS, e-mail or MMS messages, with a remote user equipment.

The method steps 301-304 in the base station 110 may be implemented through one or more processor units 450 in the base station 110, together with computer program code for performing the functions of the present method steps 301-304. Thus a computer program product, comprising instructions for performing the method steps 301-304 in the base station 110 may provide feedback to user equipments 120, 122 in a cell 130.

The computer program product mentioned above may be provided for instance in the form of a data carrier carrying computer program code for performing the method steps according to the present solution when being loaded into the processor unit 450. The data carrier may be e.g. a hard disk, a CD ROM disc, a memory stick, an optical storage device, a magnetic storage device or any other appropriate medium such as a disk or tape that can hold machine readable data. The computer program code can furthermore be provided as program code on a server and downloaded to the base station 110 remotely, e.g. over an Internet or an intranet connection.

Further, a computer program product comprising instructions for performing at least some of the method steps 301-304 may be used for implementing the previously described method in the base station 110 for providing feedback to user equipments 120, 122 in a cell 130, when the computer program product is run on a processing unit 450 comprised within the base station 110.

Figure 5:
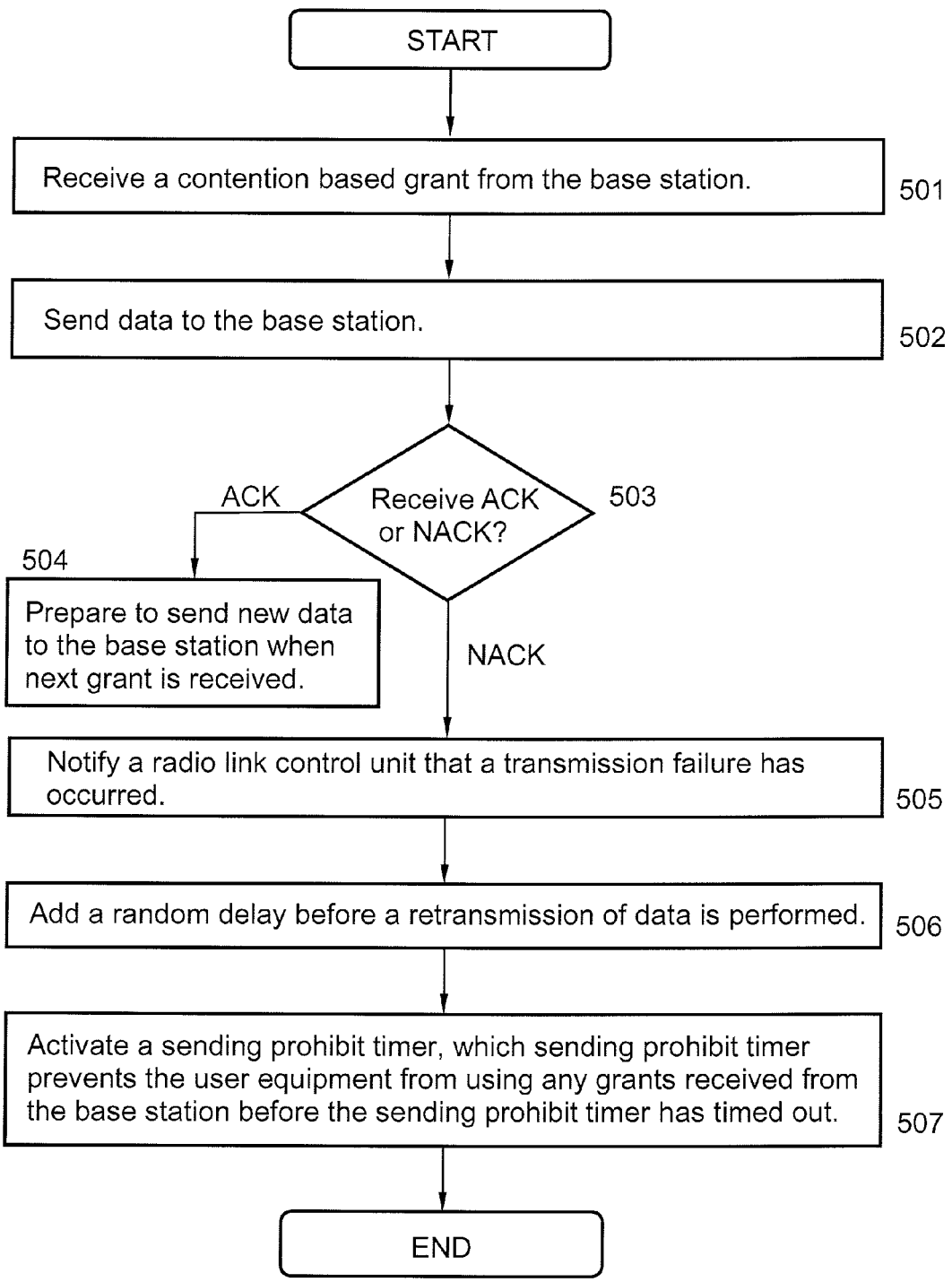
FIG. 5 is a flow chart illustrating embodiments of a method in a user equipment.

FIG. 5 is a flow chart illustrating embodiments of method steps 501-507 performed in a user equipment 120 for receiving feedback from a base station 110. The feedback to be received from the base station 110 concerns the reception status of data sent to the base station 110. The base station 110 and the user equipment 120 are comprised in a wireless communication system 100. The wireless communication system 100, the base station 110 and the user equipment 120 are adapted for contention based transmissions. The base station 110 is adapted to serve a plurality of user equipments 120, 122 within a cell 130. The feedback to be received from the base station 110 may comprise an ACK or a NACK. The wireless communication system 100 may be e.g. a LTE radio network and the base station 110 may be e.g. an evolved node B, eNB, according to some embodiments.

To appropriately send data packets and receive ACK/NACK from the base station 110 concerning the reception status of the sent data packets, the method may comprise a number of method steps 501-507.

It is to be noted that the method steps 501-507 may be performed in any arbitrary chronological order and that some of them, e.g. step 503 and step 504, or even all steps 501-507 may be performed simultaneously or in an altered, arbitrarily rearranged, decomposed or even completely reversed chronological order. Further, it is to be noted that some method steps e.g. step 506 and step 507 are optional and may only be performed within some embodiments. The method may comprise the following steps:

Step 501

A contention based grant is received from the base station 110.

Step 502

Data is sent to the base station 110. The data is sent according to the received contention based grant.

Step 503

Feedback related to the data sent in step 502 is received from the base station 110. The feedback may be an acknowledgement feedback ACK or non-acknowledgement feedback NACK.

Thus the ACK/NACK comprises an affirmation, confirming that data packages from at least one user equipment 120, 122 that has used the contention based grant have been correctly received by the base station 110.

However, a received ACK does not necessarily mean that data sent from the user equipment 120 has been correctly received by the base station 110. It may have to be resent later, using other mechanisms, such as e.g. RLC level retransmission.

Thus, according to some embodiments, for data that are not acknowledged by the base station 110, the user equipment 120 may generate a local negative acknowledgement to the RLC layer. Thereby the RLC layer may initiate a retransmission of the data and provide the RLC retransmission as new data for transmission in the buffer. The retransmission may occur e.g. on the granted contention based resource, according to some embodiments.

Step 504

If an ACK is received from the base station 110, the user equipment 120 prepares to send new data to the base station 110, when next grant is received.

The next grant may be either a contention based grant or a dedicated grant.

Step 505

This step is optional and may only be performed within some embodiments.

If a NACK is received, a radio link control retransmission may be triggered, according to some embodiments.

Step 506

This step is optional and may only be performed within some embodiments.

A random delay may be added before a retransmission of data is performed. The purpose of the optional random delay is to prevent a possible future collision of transmissions.

Step 507

This step is optional and may only be performed within some embodiments.

An optional sending prohibit timer 690 may be comprised within the user equipment 120. The optional sending prohibit timer 690 may be activated, which sending prohibit timer 690 may prevent the user equipment 120 from using any grants received from the base station 110 before the sending prohibit timer 690 has timed out, according to some embodiments.

The optional sending prohibit timer 690 may be arranged to be deactivated when a dynamic grant, dedicated to the user equipment 120, is received, according to some embodiments.

Further, the user equipment 120 may optionally be restricted to use the received contention based grant only for transmitting data for the first time within a process, or if the buffer for the process is empty.

Figure 6:
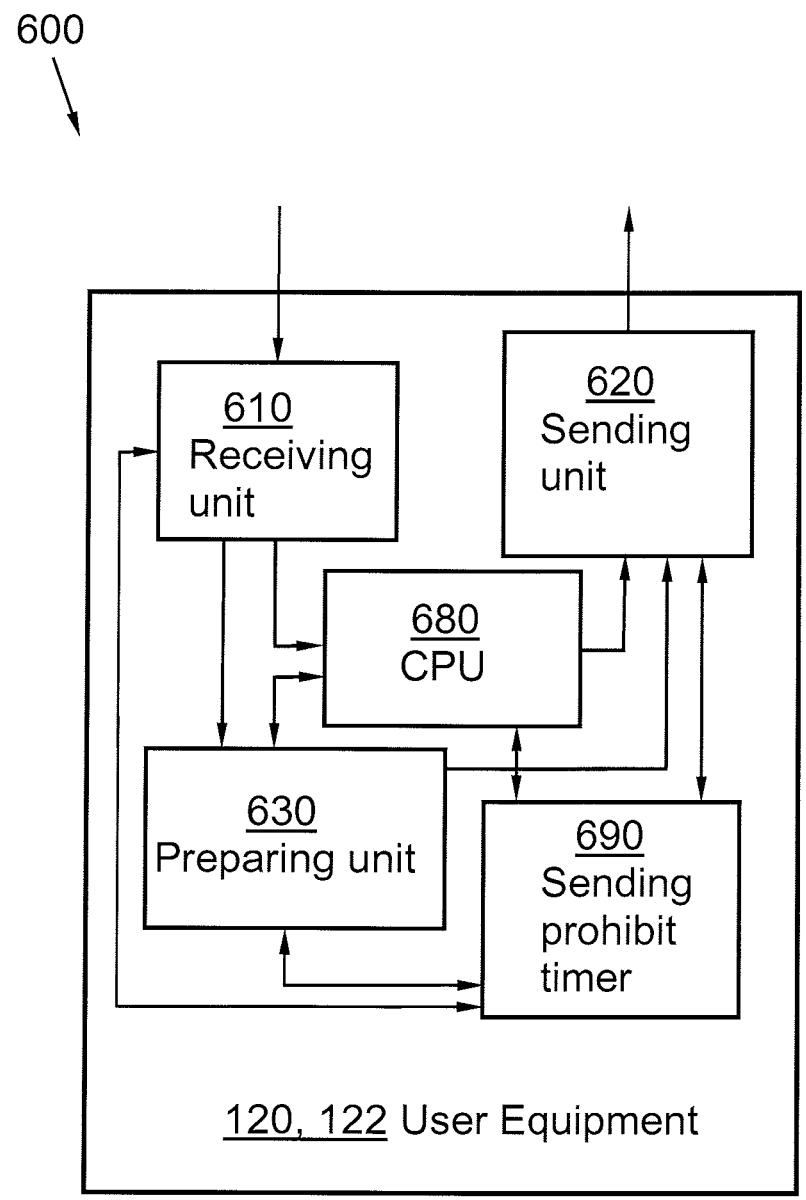
FIG. 6 is a schematic block diagram illustrating embodiments of a user equipment arrangement.

FIG. 6 schematically illustrates an arrangement 600 in a in a user equipment 120. The arrangement 600 is adapted to perform the method steps 501-507. Thus the user equipment arrangement 600 is adapted to receive feedback from a base station 110 concerning the reception status of data sent to the base station 110. The base station 110 and the user equipment 120 are comprised in a wireless communication system 100 adapted for contention based transmissions. The base station 110 is adapted to serve a plurality of user equipments 120, 122 within a cell 130. The data packages may be sent e.g. by means of a wireless radio transmission. The user equipment 120 may be a mobile terminal such as e.g. a mobile phone. The wireless communication system 100 may be e.g. a LTE radio network and the base station 110 may be e.g. an evolved node B, eNB, according to some embodiments.

In order to perform the method steps 501-507, the arrangement 600 comprises a plurality of units such as e.g. a receiver 610. The receiver 610 is adapted to receive a contention based grant and acknowledgement feedback ACK or non-acknowledgement feedback NACK from the base station 110. Also, the arrangement 600 comprises a sender 620. The sender 620 is adapted to send data to the base station 110. Additionally, the arrangement 600 comprises a preparing unit 630. The preparing unit 630 is adapted to prepare new data to be sent to the base station 110, when next grant is received from the base station 110. The next grant may be a contention based grant or a dedicated grant.

Optionally, the arrangement 600 further also may comprise a processing unit 680. The processing unit 680 may be represented by e.g. a Central Processing Unit (CPU), a processor, a microprocessor, or other processing logic that may interpret and execute instructions. The processing unit 680 may perform all data processing functions for inputting, outputting, and processing of data including data buffering and device control functions, such as call processing control, user interface control, or the like.

Furthermore, according to some embodiments, the arrangement 600 also may comprise a sending prohibit timer 690. The optional sending prohibit timer 690 may be adapted to prohibit the user equipment 120 from using any received contention based grant within a certain time. According to some embodiments, the sending prohibit timer 690 becomes activated when the user equipment 120 receives a NACK from the base station 110. When activated, the sending prohibit timer 690 may prohibit the user equipment 120 from using any contention based resources i.e. contention based grants for sending any data. The sending prohibit timer 690 may be valid over a fixed, predetermined period of time, or it may be active until the next dynamic grant for the user equipment 120 is received. When the sending prohibit timer 690 is running, the user equipment 120 may be able to do a scheduling request on the Physical Uplink Control CHannel (PUCCH). The scheduling request may be used by the user equipment 120 to request allocation of uplink resources when having data ready for transmission, but no resource grant for use of the Physical Uplink Shared CHannel (PUSCH).

Additionally, the user equipment 120 may comprise a buffer or another memory for storing data for transmission. The data can for example be received from an application executed in the user equipment 120. A controller which may be implemented in the processor 680, may select e.g. a resource block responsive to the status of the buffer, e.g. when data for transmission is detected, and the allocation determined by the processor 680, i.e. when it is detected that the resource block can be used by a plurality of user equipments 120, 122 comprising the present user equipment 120. The data may then be forwarded to the sender 620, e.g. using a physical layer of the user equipment 120, and at least a first part of the data may be transmitted using the resource block selected by the controller.

It is to be noted that any internal electronics of the user equipment 120 and/or the user equipment arrangement 600, not completely necessary for understanding the present method according to the method steps 501-507 has been omitted from FIG. 6, for clarity reasons. Further, it is to be noted that some of the described units 610-690 comprised within the arrangement 600 in the user equipment 120 are to be regarded as separate logical entities but not with necessity separate physical entities. To mention just one example, the receiver 610 and the sender 620 may be comprised or co-arranged within the same physical unit, a transceiver, which may comprise a transmitter circuit and a receiver circuit, which transmits outgoing radio frequency signals and receives incoming radio frequency signals, respectively, via an antenna. The radio frequency signals transmitted between the base station 110 and the user equipments 120, 122 may comprise both traffic and control signals e.g. paging signals/messages for incoming calls, which may be used to establish and maintain a voice call communication with another party or to transmit and/or receive data, such as SMS, e-mail or MMS messages, with a remote user equipment.

The present mechanism for sending and/or receiving data packets and sending/receiving ACK/NAK acknowledgements may be implemented through one or more processors 680 in the user equipment arrangement 600 depicted in FIG. 6, together with computer program code for performing the method steps 501-507 of the present solution. The program code mentioned above may also be provided as a computer program product, for instance in the form of a data carrier carrying computer program code for performing the present solution when being loaded into the user equipment 120. One such carrier may be in the form of a memory stick. It is however feasible with other data carriers. The computer program code may furthermore be provided as program code on a server and downloaded to the user equipment 120 remotely.

When using the formulation "comprise" or "comprising" it is to be interpreted as non-limiting, i.e. meaning "consist at least of". The present invention is not limited to the above described preferred embodiments. Various alternatives, modifications and equivalents may be used. Therefore, the above embodiments are not to be taken as limiting the scope of the present invention, which is defined by the appending claims.

The invention claimed is:

1. A method in a user equipment for receiving feedback from a base station concerning the reception status of data sent to the base station, the base station and the user equipment are comprised in a wireless communication system adapted for contention based transmissions, the base station is adapted to serve user equipments within a cell of a cellular network, the method comprising the user equipment unit:
   receiving a contention based grant sent from the base station to the cell of the cellular network, wherein the contention based grant initiates uplink data transfer from at least one user equipment of the plurality of user equipments which is uplink time aligned,
   sending data to the base station,
   receiving feedback from the base station on a channel that is transmitted to plural user equipments and wherein whether the feedback is acknowledgment feedback "ACK" or non-acknowledgment feedback "NACK" depends on whether the base station has verified that data has been correctly received from at least one of the plural user equipments, and
   if an ACK is received, preparing to send new data to the base station, when next grant is received, and
   if a NACK is received, the method further comprising:
      triggering a radio link control retransmission, and
      activating a sending prohibit timer, which sending prohibit timer prevents the user equipment from using any grants received from the base station before the sending prohibit timer has timed out, and wherein the sending prohibit timer is arranged to be deactivated when a dynamic grant, dedicated to the user equipment, is received.

2. The method according to claim 1, further comprising: adding a random delay before a retransmission of data is performed.

3. An arrangement in a user equipment for receiving feedback from a base station concerning the reception status of data sent to the base station, the base station and the user equipment are comprised in a wireless communication system adapted for contention based transmissions, the base station is adapted to serve user equipments within a cell of a cellular network, the arrangement comprising:
   a receiver, adapted to receive a contention based grant sent from the base station to the cell of the cellular network, wherein the contention based grant initiates uplink data transfer from at least one user equipment of the plurality of user equipments which is uplink time aligned, and wherein the received is also adapted to receive acknowledgement feedback "ACK" or non-acknowledgement feedback "NACK" from the base station, the feedback being received from the base station on a channel that is transmitted to plural user equipments and wherein whether the feedback is acknowledgment feedback or non-acknowledgment feedback depends on whether the base station has verified that data has been correctly received from at least one of the plural user equipments;
   a sender, adapted to send data to the base station, wherein the sender is further configured, if a NACK is received, to activate a sending prohibit timer, which sending prohibit timer prevents the user equipment from using any grants received from the base station before the sending prohibit timer has timed out, and wherein the sending prohibit timer is arranged to be deactivated when a dynamic grant, dedicated to the user equipment, is received; and
   a preparing unit, adapted to prepare new data to be sent to the base station, when next grant is received.

4. The method according to claim 1, wherein the feedback ACK/NACK is sent over a Physical Hybrid Automatic Repeat Request Indicator Channel "PHICH".

5. The arrangement of claim 3, wherein the feedback ACK/NACK is sent over a Physical Hybrid Automatic Repeat Request Indicator Channel "PHICH".

6. The arrangement of claim 3, wherein the sender is configured, if a NACK is received, to trigger a radio link control retransmission and to add a random delay before a retransmission of data is performed.

7. A method in a user equipment for receiving feedback from a base station concerning the reception status of data sent to the base station, the base station and the user equipment are comprised in a wireless communication system adapted for contention based transmissions, the base station is adapted to serve user equipments within a cell of a cellular network, the method comprising the user equipment unit:
   receiving a contention based grant sent from the base station to the cell of the cellular network, wherein the contention based grant initiates uplink data transfer from at least one user equipment of the plurality of user equipments which is uplink time aligned,
   sending data to the base station,
   receiving feedback from the base station on a channel that is transmitted to plural user equipments and wherein whether the feedback is acknowledgment feedback "ACK" or non-acknowledgment feedback "NACK" depends on whether the base station has verified that data has been correctly received from at least one of the plural user equipments, and
   if an ACK is received, preparing to send new data to the base station, when next grant is received, and
   wherein the user equipment is restricted to use the received contention based grant only for transmitting data for the first time within a process, or if the buffer for the process is empty.

8. The method according to claim 7, further comprising: adding a random delay before a retransmission of data is performed.

9. The method according to claim 7, wherein the feedback ACK/NACK is sent over a Physical Hybrid Automatic Repeat Request Indicator Channel "PHICH".

10. An arrangement in a user equipment for receiving feedback from a base station concerning the reception status of data sent to the base station, the base station and the user equipment are comprised in a wireless communication system adapted for contention based transmissions, the base station is adapted to serve user equipments within a cell of a cellular network, the arrangement comprising:

> a receiver, adapted to receive a contention based grant sent from the base station to the cell of the cellular network, wherein the contention based grant initiates uplink data transfer from at least one user equipment of the plurality of user equipments which is uplink time aligned, and wherein the received is also adapted to receive acknowledgement feedback "ACK" or non-acknowledgement feedback "NACK" from the base station, the feedback being received from the base station on a channel that is transmitted to plural user equipments and wherein whether the feedback is acknowledgment feedback or non-acknowledgment feedback depends on whether the base station has verified that data has been correctly received from at least one of the plural user equipments;
>
> a sender, adapted to send data to the base station;
>
> a preparing unit, adapted to prepare new data to be sent to the base station, when next grant is received; and
>
> wherein the user equipment is restricted to use the received contention based grant only for transmitting data for the first time within a process, or if the buffer for the process is empty.

11. The arrangement of claim 10, wherein the feedback ACK/NACK is sent over a Physical Hybrid Automatic Repeat Request Indicator Channel "PHICH".

12. The arrangement of claim 10, wherein the sender is configured, if a NACK is received, to trigger a radio link control retransmission and to add a random delay before a retransmission of data is performed.

* * * * *